Feb. 9, 1943.  JOHANN-GEORG HELMBOLD  2,310,783
MEASURING DEVICE
Filed Nov. 10, 1939  2 Sheets-Sheet 1
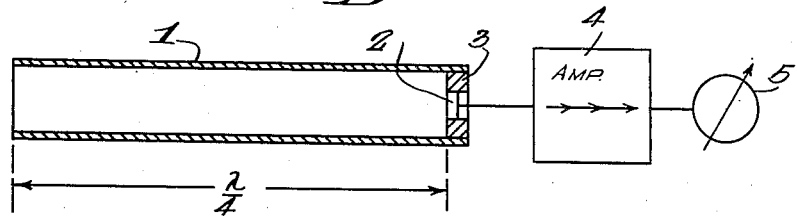
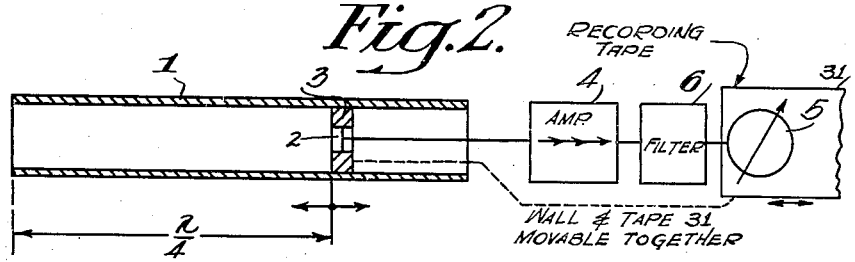
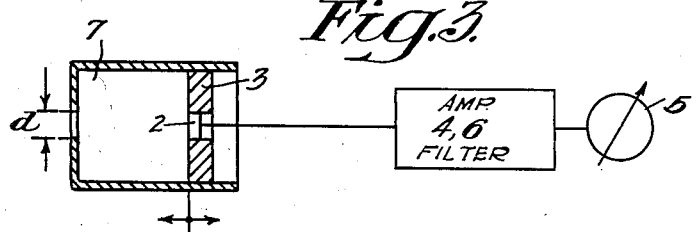
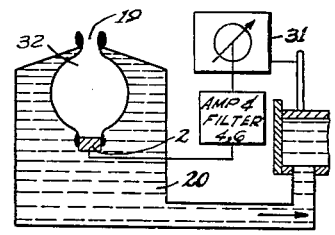
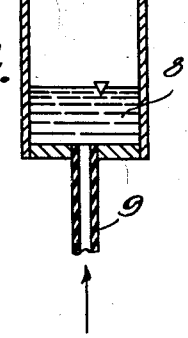
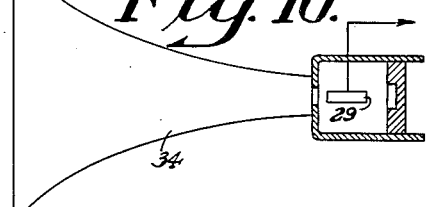
Inventor
Johann Georg Helmbold
By
Attorney

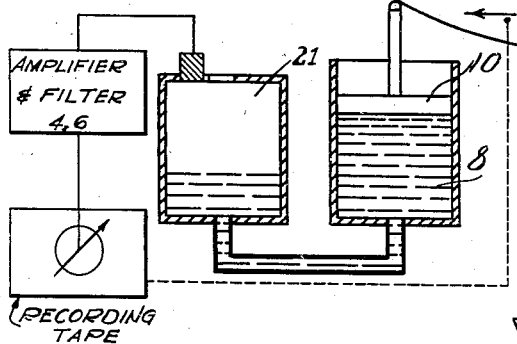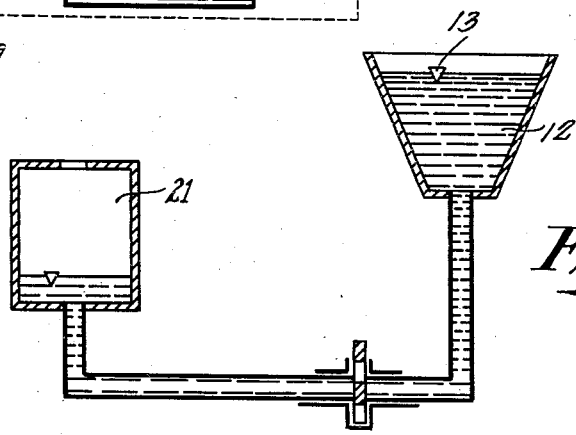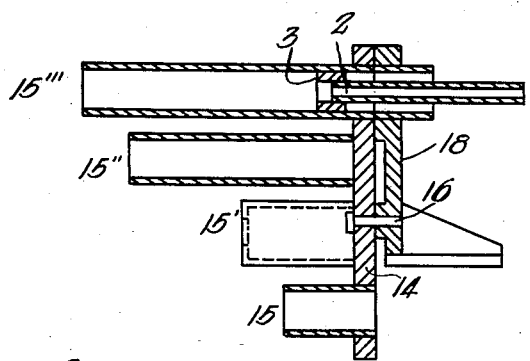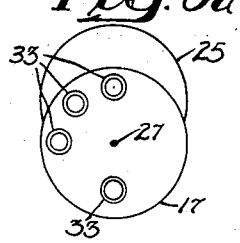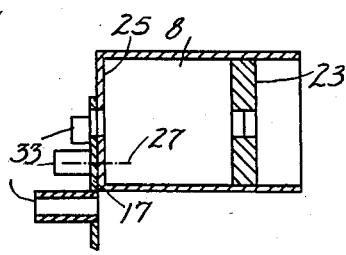

Patented Feb. 9, 1943

2,310,783

UNITED STATES PATENT OFFICE 2,310,783

MEASURING DEVICE

Johann-Georg Helmbold, Berlin, Germany; vested in the Alien Property Custodian

Application November 10, 1939, Serial No. 303,922
In Germany November 10, 1938

6 Claims. (Cl. 181—0.5)

This invention relates to measuring devices such as are utilized to indicate or record the level or intensity of sound, and has for its principal object the provision of an improved device and method of operation whereby sounds of low intensity are readily measured or indicated.

The problem of satisfactory conversion of acoustic patterns or pure tones into electric current or potential variations is not attended with any difficulties as long as the equivalent potentials produced by the sound pickup means such as a microphone are high in comparison with the noise potentials which already happen to be in the aggregate channel containing the pickup equipment. Outstanding among this noise is the roar of the first amplifier stage due to shot effect and the quantum nature of the current itself. This noise which prevails in the pickup equipment itself determines the lower limit up to which satisfactory pickup and measurement of sound are still feasible. This limit, as a general rule, ranges around 25–30 phon. The word "phon" indicates the loudness level as defined on page 276 of the January 1938 issue of The Journal of the Acoustical Society of America. Smaller acoustic energies are not exactly perceptible or measurable at all by the customary ways and means comprising microphone and amplifier.

However, numerous cases are met with in practice where exact sound measurements and analyses must be made below the aforesaid limit, sometimes even down to acoustic intensities which fall inside the range of the threshold of the ear. As a matter of fact, such measurements falling below the sound volume fixed by the noise level of the measuring devices have heretofore not been accomplishable by direct ways and means.

The present invention discloses a method which is practicable also within the range of low sound intensities down to the very zero level of the scale of phon units, that is to say, the threshold value of response of the ear, and which furnishes accurate measuring results. Measurements of this kind are, inter alia, necessary also where it is desired to investigate and analyze the components of a noise spectrum individually, and these, as known, are often minute. Although these various components taken separately are mostly of very low intensity, in the aggregate they are liable to occasion serious annoyance in a great many cases, among others in sound film work.

In measuring acoustic actions by the aid of a suitable amplifier, one requirement is that a minimum potential should be delivered from the microphone into the input circuit of the preamplifier tube, so as to raise the signal level above the noise level, that is to say, above the level of the noise potential in the amplifier itself. However, the conventional type of microphone is incapable of supplying these minimum potentials where the acoustic powers are low, below 25–30 phon.

According to the invention, amplification of sound impulses is accomplished by purely acoustic means before the acoustic energy is converted into electric potential variations. By virtue and means of the actions associated with acoustic resonance, it is possible to reinforce a sound impulse to around a 30-fold level, and this means an increase of the sound intensity by about 30 phon. As a result of such acoustic amplification, sound impulses are increasable in their sound intensity by just the amount that had heretofore been wanting for the performance of perfect measurements. In other words, the level of sound volume is raised around 30 phon prior to the conversion of the acoustical impulses into corresponding electrical impulses.

The acoustic amplification upon which the method here disclosed is predicated is accomplishable, for instance, by the intermediary of resonators. After such purely acoustic reinforcement by resonance, the sound impulse, in the customary way, is picked up by a microphone, converted into electric potential variations, and finally fed to the recording or measuring amplifier.

The invention will be better understood from the following description considered in connection with the accompanying drawings, and its scope is indicated by the appended claims.

Referring to the drawings,

Figures 1 to 3 are longitudinal sectional views which illustrate various embodiments of a measuring device wherein the frequency or frequencies of the electrical impulses acoustically amplified are determined by the position of the end wall of the resonator.

Figures 4 to 6 are longitudinal sectional views which illustrate different embodiments of a measuring device wherein the tuning of the resonator is dependent on the adjustment in the level of a liquid, Figures 7 and 8 are longitudinal sectional views which illustrate an assemblage including adjustable resonators of different diameter, Figure 8a is a side elevation of the device illustrated in Fig. 8, Figure 9 is a sectional view which illustrates an adjustable resonator of spherical shape, and Figure 10 is a sectional view which illustrates a combined horn and resonator structure.

The embodiment shown in Fig. 1 of the appended drawings comprises a resonant chamber formed by an open tube 1, closed at the end by a wall or piston 3. Arranged in the wall 3 is a translating means 2 responsive to pressure action, for instance, a microphone which, by way of an amplifier 4, is connected to an indicator or recording device 5. Among acoustic actions of feeble intensity which reach the open end of the resonator tube, those frequencies whose quarter-wave length is equal to the length of the tube will be amplified, as is well known in the art, by virtue of resonance. Included in such amplification are also the harmonics of the fundamental frequency, whereas all frequencies falling outside the resonance point will remain unamplified. Hence, this device is selective in respect to a definite frequency group, and the various frequencies included in this group, even if their intensity falls below the 30-phon mark, will be observable or measurable with the recording or measuring outfit by virtue of the acoustic amplification by resonance.

The scheme just described is adapted to analysis or determination of a single frequency or frequency group. It is, however, often desirable to embrace a larger frequency band. A case of this kind arises particularly in recording or analyzing sound spectra and noises. Adapted to the analysis of a frequency band of more than average width is an arrangement as shown in Fig. 2. Also in this embodiment the resonator consists of a tube 1 in which the wall 3 is shiftable in the longitudinal direction of the tube, so that by shifting said wall in the axial sense of the tube a definite frequency band will in sequence be covered. Indeed, by such method the various frequency components of the entire tonal range or spectrum to be investigated will consecutively come to be in resonance and will thus, by way of the amplifier 4, be indicated in reading or indicating instrument 5. In the embodiment shown, a filter 6 is interposed between the amplifier and indicator instrument, the said filter having the purpose of precluding from the measuring instrument such harmonics as may happen to have been amplified by the resonator tube. In the recording of measuring results, the embodiment just described may be designed in a particularly favorable way in connecting the recording tape 31 with the shiftable wall 3 so that to each point on the recording tape there is coordinated one, and only one, wall position, and thus a definite frequency; in other words, the various measuring values automatically are made to correspond on the recording tape to the different frequencies.

A further development of this arrangement is shown in Fig. 3, where instead of a unilaterally open tube a Helmholtz resonator 7 is used, the closure plate of which has a tiny opening of diameter d. Because of the loose coupling relationship between the resonator and the open space, particularly sharp resonance points are obtainable with this arrangement. As to the rest, the operation of the arrangement is the same as that in Fig. 2.

In connection with the use of the variable resonators shown in Figs. 2 and 3, the assumption is made that the shifting of the bottom wall or piston 3 inside the tube is not attended by any noise. Inasmuch as such noiseless shifting may involve difficulties if accomplished mechanically, another exemplified embodiment of a variable resonator of the Helmholtz type is shown in Fig. 4, in which the change in size of the resonator space proceeds perfectly without noise. In fact, to change the resonator space a liquid 8 is used here, the level of which, as is well known in physics, may be raised or lowered by the aid of communicating or U-tubes and the admission pipe 9. Microphone 2 in this embodiment is fitted in a wall of the resonator space, although it could also be arranged in any other suitable manner.

Fig. 5 illustrates another form of construction adapted to fill the resonator 21 to different levels with a liquid. Liquid 8 is confined inside a compression cylinder which is shut by the piston 10. By movement of the said piston the level of the liquid inside the resonator is adjusted at will. The motion of the piston in this device may be controlled by gauges 11, the resonance of the resonator being a function of the longitudinal shift of the gauge according to any desired law. If, then, the controlling gauge is positively associated with the recording strip, as described by reference to exemplified embodiment Fig. 2, conditions can be made so that a logarithmic graduation or calibration of the frequency scale is obtained.

The variation of the resonator space 21 may be effected in a similar way according to any desired function, if, as shown in Fig. 6, the liquid container 12 is made of a certain, predetermined shape, say of a funnel, so that the level and surface of the liquid being registered, for instance, by a float 13, bears a certain and desired dependence upon the resonance frequency of the resonator.

Since, as is well known, sharp resonance is a function not only of the length of the resonator tube that is used, but also of the diameter thereof, it will be found to be inexpedient to use one and the same tube for very large frequency bands. On the contrary, it is advisable to employ resonators of graduated diameters to suit the frequency ranges or bands to be analyzed. An arrangement of the kind adapted for this purpose is shown in Fig. 7. Referring to this figure, it will be seen that resonators of varying diameters 15, 15', 15'', 15''', are attached to a revolvable revolver type head 14, these resonators being adapted to be connected at will with the pressure responsive means 2, which is supported by a supporting bracket 18, by turning the whole head about the shaft or axis 16.

Figs. 8 and 8a show another embodiment comprising a Helmholtz resonator with shiftable wall 23 and a fixed closing plate 25 on which is fitted a revolver type head 17 in which pipe studs 33 of different lengths are mounted. These tubular studs or nipples are arranged to be shifted at will anteriorly of the opening of the resonator by rotating the head 17 about its axis 27. The air volume confined therein governs the frequency range of the resonator.

Inasmuch as a Helmholtz resonator is of optimum action in proportion as the enclosed mass of air approaches the spherical form, another embodiment adapted to the measurement of small sound volumes is shown in Fig. 9, in which a roughly spherical air space is used for the resonator. In fact, this air space consists of a rubber ball or a rubber skin which shuts the orifice 19 of a liquid container 20. According to the amount of liquid that is withdrawn from the completely filled container can the size of the air space confined inside the rubber skin 32 be varied. There thus results a roughly spherical resonator to which the microphone 2 is fitted, for instance, at the bottom end.

In combination with all of the arrangements hereinbefore disclosed adapted to amplify and reinforce sound volume of the frequencies to be measured, other means may be used which either serve to raise the sound intensity or to increase the directivity of the measuring device. As shown in Fig. 10, funnels 34, for instance, of different shape, length and apertural relation may be fitted anteriorly of the opening of the resonator, said funnels serving to increase and amplify the acoustic energy impinging upon the resonator and to obtain directional effect.

Moreover, instead of pickup means or microphones which are responsive to pressure variations, it is possible to use microphones of a kind responsive to the maximum motional amplitude. Microphones of this type naturally are mounted at points of the resonator where the maximum amplitude of motion arises, that is, for instance, at the inlet or input of the resonator as shown by the position of microphone 29 in Fig. 10. The use of combination pressure and motion responsive pickup means is also feasible.

What is claimed is:

1. In a sound amplifier the combination including a spherical resonant chamber for receiving sound waves to be amplified, means responsive to said sound waves within said resonant chamber for converting said sound waves to electrical impulses, and means including a liquid disposed within said resonant chamber for varying volume of said spherical chamber and hence the resonant frequency of said chamber.

2. In a frequency selective sound amplifier the combination including a resonator tube for receiving sound waves, means responsive to sound waves within said resonator tube for converting said sound waves into electrical impulses, means for supplying a liquid to said tube for varying the effective length thereof, means connected to said supply means for varying the amount of said liquid in said tube in accordance with a predetermined function of frequency and means for indicating said frequency.

3. In a frequency selective sound amplifier the combination including a resonator tube for receiving sound waves, means responsive to sound waves within said resonator tube for converting said sound waves into electrical impulses, means for supplying a liquid to said tube for varying the effective length thereof, and means connected to said supply means for varying the amount of said liquid in said tube in accordance with a logarithmic function of frequency.

4. In a sound amplifier the combination of a liquid container including an expansible resonant chamber for receiving and amplifying sound waves, translating means responsive to sound waves in said chamber for producing equivalent electrical waves, means for supplying a liquid to said container, and means connected to said supply means for controlling the amount of said liquid in said container whereby the volume of said expansible resonant chamber and its resonance can be varied throughout a range of frequencies.

5. In an acoustic amplifier for amplifying sound impulses which are normally at a level below the noise level of said amplifier, the combination including a liquid container surrounding all but a small opening of an expansible accoustic resonant chamber for receiving said sound impulses, translating means responsive to said sound impulses in said chamber for producing corresponding electrical impulses, means responsive to said translating means for amplifying said electrical impulses, means for introducing a liquid into said container, and means connected to said liquid introducing means for varying the volume of said expansible chamber for varying the resonant frequency thereof.

6. In a frequency-selective sound amplifier, the combination including a resonant chamber for receiving sound waves to be amplified, means responsive to said sound waves in said resonant chamber for converting said sound waves to electrical impulses, means including a liquid disposed within said resonant chamber for varying the volume of said chamber and hence the resonant frequency thereof, and means responsive to said first mentioned means for amplifying said electrical impulses.

JOHANN-GEORG HELMBOLD.